United States Patent [19]
Sasaki

[11] Patent Number: 4,664,361
[45] Date of Patent: * May 12, 1987

[54] SPRING UNIT
[75] Inventor: Noboru Sasaki, Tokyo, Japan
[73] Assignee: France Bed Co., Ltd., Tokyo, Japan
[*] Notice: The portion of the term of this patent subsequent to Oct. 28, 2003 has been disclaimed.
[21] Appl. No.: 731,605
[22] Filed: May 7, 1985

Related U.S. Application Data
[63] Continuation of Ser. No. 579,652, Feb. 13, 1984, abandoned.

[30] Foreign Application Priority Data
Jul. 25, 1983 [JP] Japan ................. 58-115286

[51] Int. Cl.[4] .................................. F16F 3/04
[52] U.S. Cl. .......................... 267/100; 5/256; 5/267; 5/276; 5/475; 267/103
[58] Field of Search ................. 267/91–106; 5/271–277, 256, 257, 260, 262, 267, 269, 475

[56] References Cited
U.S. PATENT DOCUMENTS

| | | | |
|---|---|---|---|
| 3,286,281 | 11/1966 | Slominski | 5/247 |
| 3,657,749 | 4/1972 | Norman | 5/475 |
| 3,911,511 | 10/1975 | Higgins et al. | 5/475 X |
| 4,371,152 | 2/1983 | Kitchen et al. | 267/103 |

FOREIGN PATENT DOCUMENTS

| | | | |
|---|---|---|---|
| 1155218 | 10/1963 | Fed. Rep. of Germany | 5/475 |
| 508271 | 7/1920 | France | 5/256 |
| 5668 | 6/1828 | United Kingdom | 5/475 |
| 386251 | 1/1933 | United Kingdom | 5/269 |

Primary Examiner—George E. A. Halvosa
Attorney, Agent, or Firm—Frishauf, Holtz, Goodman & Woodward

[57] ABSTRACT

A plurality of main springs and a plurality of intermediate support springs are arranged on a rectangular base plate. Each main spring is made of a single steel wire and consists of two coil portions and a straight rod portion connecting these two coil portions. The rod portions of the main springs are arranged at right angles, thus forming a lattice. One end of each coil portion is fastened to a frame. The other end of each coil portion is fastened to the base plate. Each coil portion is shaped like a cone, an inverted cone, a hourglass or a barrel.

5 Claims, 14 Drawing Figures

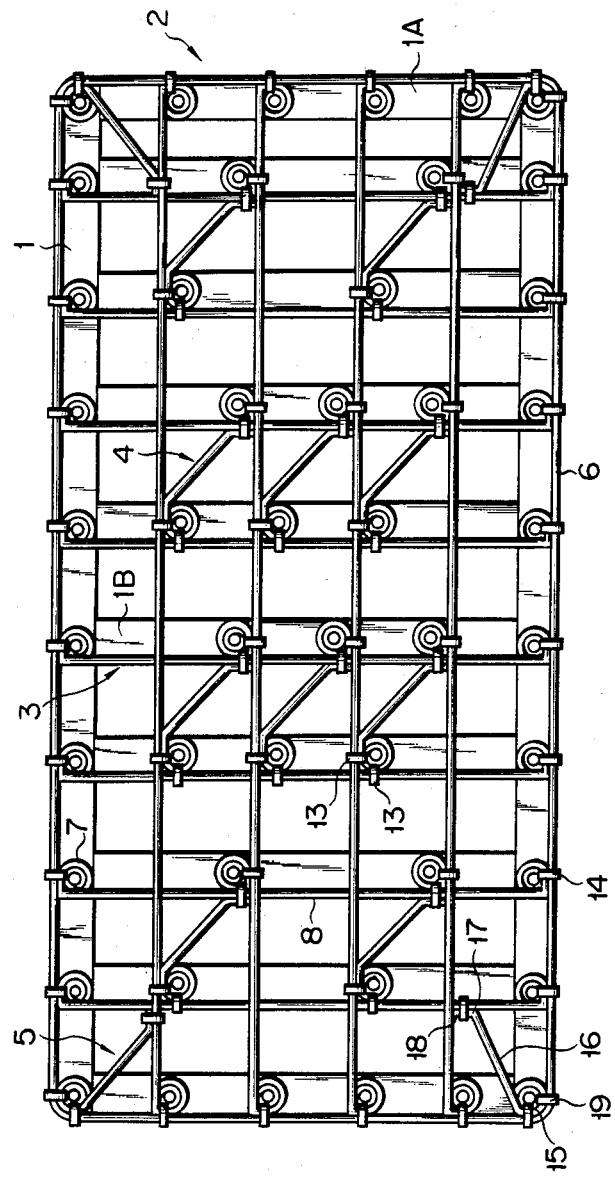
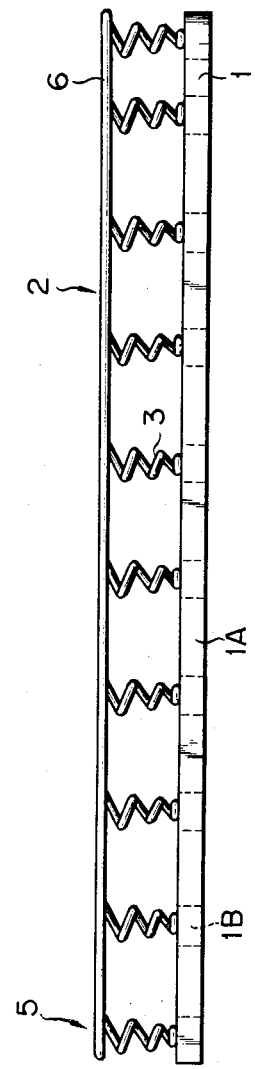
FIG. 1
FIG. 2

F I G. 8
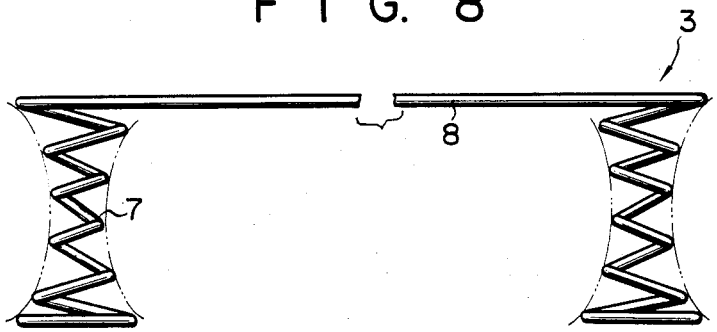
F I G. 9
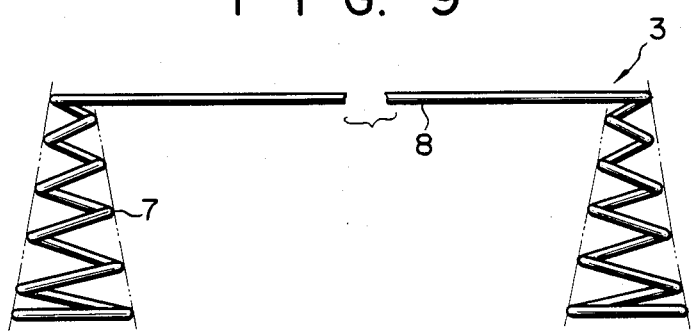
F I G. 10
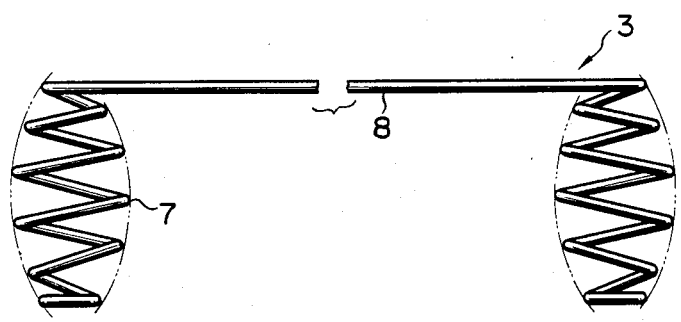

SPRING UNIT

This application is a continuation of application Ser. No. 579,652, filed FEB. 13, 1984, and now abandoned.

BACKGROUND OF THE INVENTION

The present invention relates to a spring unit for use in a mattress or a box spring.

A conventional spring unit used in a mattress or a box spring comprises a plurality of main springs. Each main spring is made of a single wire and has a straight rod portion and two spring protions. The upper ends of these spring portions are coupled to the ends of the rod portion. The main springs are disposed on a rectangular base plate. They are divided into a first group of long main springs and a second group of short main springs. The long main springs are arranged parallel to the long sides of the base plate and the short main springs are arranged parallel to the short sides of the base plate. Hence, the main springs of both groups form a lattice. The lower ends of the spring portions are secured to the four edges of the base plate. The rod portions are reinforced by intermediate support springs. Like the main spring, each intermediate support spring has a straight rod portion and two spring portions. The upper ends of the spring portions are coupled to the ends of the rod portion, and the lower ends of the spring portions are secured to the base plate.

In the conventional spring unit, the spring portions of the main springs and intermediate support springs are torsion bar springss. A torsion bar spring deforms very slightly when a compressive load is applied on it. However, it will be permanently deformed if a compressive load is applied on it many times. The known spring unit, which comprises torsion bar springs, may lose its elasticity in a relatively short time.

SUMMARY OF THE INVENTION

Therefore, the object of the present invention is to provide a spring unit which retains a high elasticity over a long period of time.

According to the invention, there is provided a spring unit which comprises a rectangular base plate; a plurality of main springs each having a first straight rod portion and two first coil portions in the form of a cone, an inverted cone, a hourglass, or a barrel which are connected at one end to the ends of the first straight rod portion, said main springs being disposed on said rectangular base plate with the first straight rod portions arranged at right angles to one another; first fastening means fastening the other end of each first coil portion to said rectangular base plate; a rectangular frame; first coupling means coupling said rectangular frame to said one end of each first coil portion; a plurality of intermediate support springs disposed on said rectangular base plate; second coupling means coupling one end of each intermediate support spring to the corresponding first straight rod portion; and second fastening means fastening the other end of each intermediate support spring to said rectangular base plate.

BRIEF DESCRIPTION OF THE DRAWINGS

FIG. 1 is a plan view schematically showing a spring unit according to the present invention;

FIG. 2 is a side view of the spring unit shown in FIG. 1;

FIGS. 8 to 10 are side views of a main spring of other types;

DETAILED DESCRIPTION OF THE PREFERRED EMBODIMENT

Figure 3:
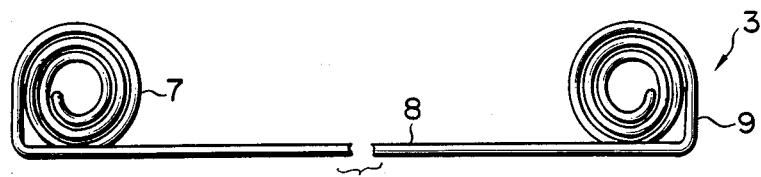
FIG. 3 is a plan view of one of the main springs of the spring unit.

As shown in FIGS. 1 and 2, a spring unit, an embodiment of the invention, has a base plate 1. The plate 1 comprises a rectangular base frame 1A and a plurality of parallel crosspieces 1B fixed to the base frame 1A. The crosspieces 1B are parallel to the short sides of the base frame 1A and spaced apart from one another at equal intervals. The spring unit further comprises a plurality of main springs 3, a plurality of intermediate support springs 4, four corner springs 5 and a rectangular wire frame 6. The springs 3 and springs 5 are disposed in a specific manner, as will be described later.

The rectangular wire frame 6 is made of a steel wire having a circular cross-section. Its size is substantially the same as that of the base plate 1.

Figure 4:
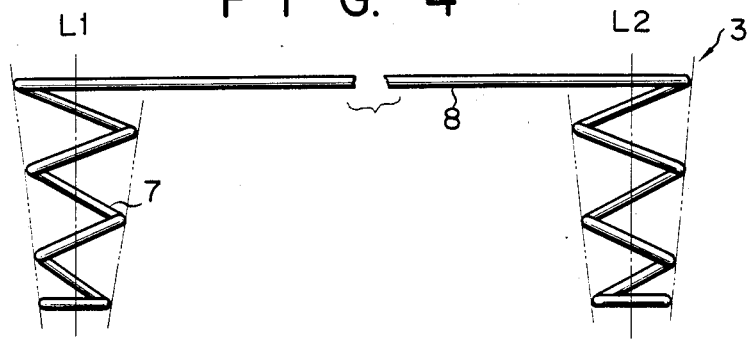
FIG. 4 is a side view of the main spring.

As shown in FIGS. 3 and 4, each main spring 3 is a steel wire having a circular cross-section and has a straight rod portion 8 and two coil portions 7 which are provided with two straight segments 9 respectively. One end of the straight segments 9 are continuous to the ends of the rod portion 8 respectively and the other ends of the straight segments 9 are continuous to two coil portions 7 respectively. The axis L1 of one of the coil portions 7 and the axis L2 of the other coil portion are parallel as illustrated in FIG. 4. The straight segments 9 are substantially at right angles to the rod portions 8, as shown in FIG. 3.

Figure 7:
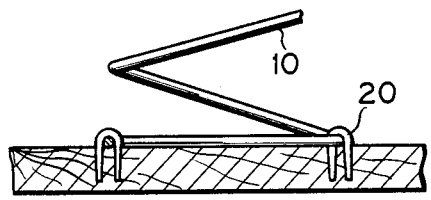
FIG. 7 is a side view of a portion of a base plate and a portion of a coil secured to this plate.

The main springs 3 are divided into, e.g., a first group of long springs 3 and a second group of short springs 3. On the base plate 1, the long main springs 3 are arranged parallel to the long sides of the frame 1A and the short springs 3 are arranged parallel to the short sides of the frame 1A. Hence, the rod portions 8 of the main springs 3 of both groups form a lattice. The coil portions 7 of every main spring 3 are secured at the other ends to the frame 1A by staples 20, as illustrated in FIG. 7.

Figure 5:
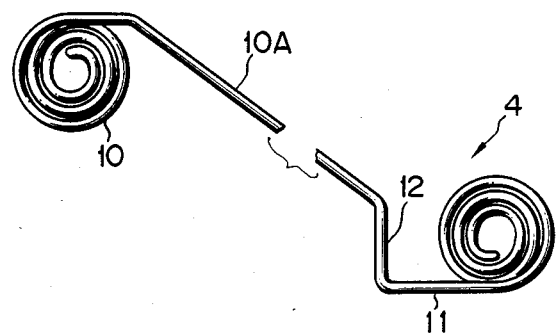
FIG. 5 is a plan view of one of the intermediate support springs of the spring unit.

Each intermediate support spring 4 is made of a single steel wire having a circular cross-section, like each main spring 3. As shown in FIG. 5, it has a straight rod portion 10A, first straight segments 11, a second straight segment 12, and coil portions 10. One of the first straight segments 11 is continuous at one end to one end of the second straight segment 12, whose other end is continuous to one end of the rod portion 10A. The other first straight segment 11 is continuous at one end to the other end of the rod portion 10A. The upper end of the first coil portion 10 is continuous to the other end of the first straight segment 11, and the other coil portion 10 is continuous to the other end of the straight segment 11. The straight segments 11 and 12 are at right angles to each other, forming an L-shaped portion.

The straight rod portion 10A of each intermediate support spring 4 is much shorter than the straight rod portion 8 of each main spring 3. More specifically, the length of the rod portion 10A is substantially equal to the diagonal length of each box of the lattice formed by the rod portions 8 of the main springs 3.

As shown in FIG. 1, each corner spring 5 is made of a single steel wire having a circular cross-section. It has a coil portion 15, a straight portion 16, and a straight segment 17. The straight segment 17 is continuous to one end of the straight portion 16 and inclined at a particular angle thereto. The upper end of the coil portion 15 is continuous to the other end of the straight portion 16.

Figure 6:
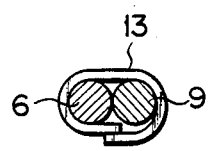
FIG. 6 is an enlarged sectional view of a pair of wires bound together.

As shown in FIGS. 1 and 6, the rectangular wire frame 6 is fastened to the straight segments 9 of each main spring 3 by clips 13. Likewise, the upper ends of the coil portions of each intermediate support spring 4 are fastened by clips 13 to the rod portion 8 of one short main spring 3, respectively. The straight portions thereof are fastened by clips 13 to the rod portions 8 of one long main spring 3 and the straight segment 12 thereof is also fastened by clips 13 to the rod portion 8 of one short main spring 3, respectively. Similarly, the upper end of the coil portion 15 of each corner spring 5 is fastened at two points by clips 19 to the corresponding corner portion of the frame 6. The straight segment 17 of each corner spring 5 is fastened by a clip 18 to the straight rod portion 8 of one main springs 3.

The clips 13, 14, 18 and 19 are metal strips having a predetermined width. Each clip is bent around two steel wires, thus bundling them together.

As shown in FIG. 4, the coil portions 7 of each main spring 3 are shaped like an inverted cone. In other words, their diameter decreases along their axes toward their lower ends. Their diameter is not so large that they touch each other. The coil portions 10 of each intermediate support spring 4 and the coil portions 15 of each corner spring 5 are identical with these coil portions 7 in shape and diameter. The coil portions 7, 10 and 15 are indeed more liable to elastically deform than torsion bar springs when a compressive load is applied on them,, but they are less liable to permanent deformation than torsion bar springs. Hence, their elasticity is preserved over a long period of time, unlike that of torsion bar springs.

As mentioned above, the coil portions 7, 10, 15 are shaped like an inverted cone. Hence, when a load acts on each coil portion 7, 10, 15 the turn of the greatest diameter is first elastically deformed, the turn of the second greatest diameter is then deformed, and so forth. When the spring unit is used as bed spring unit, it can comfortably support the user lying on the bed, regardless of his weight. In other words, the bed is neither too soft nor too hard to the user. Since the diameter of the coil portion 7, 10, 15 of each main spring 3 decreases toward the lower end, the turns do not contact one another when the coil portion 7 is compressed, thus generating no noise.

According to the present invention, the shape of the coil portions of each main spring 3 or each corner spring 5 is not limited to the inverted cone shape. The coil portion may take any other non-cylindrical shape. For example, it may be shaped like a hourglass as shown in FIG. 8. Alternatively, it may have such a conical shape as illustrated in FIG. 9. Further, it may be shaped like a barrel as depicted in FIG. 10.

The coil portion of each intermediate support spring 4 may have a cylindrical shape. It may also be shaped like a cone, an inverted cone, a barrel, or a hourglass. The intermediate support springs 4 may be torsion bar springs.

In the embodiment described above, each main spring 3 is made of a single steel wire. Instead, it may be formed of two sections each of which is made of a steel wire. In this case, each section may have a straight rod element portion and a coil spring portion. The straight rod element portion of the sections may be coupled to that of the other section, thus forming a main spring 3 which has one straight rod portion consisting of the two coupled rod element portions.

Figure 11:
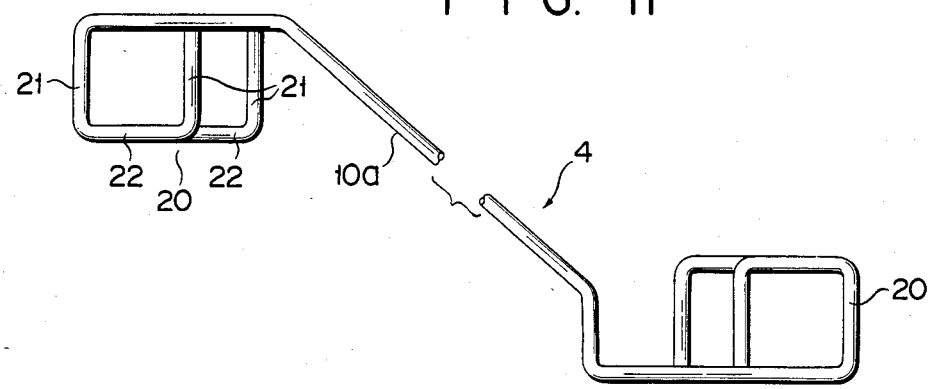
FIG. 11 is a plan view of the intermediate support spring of another type.
Figure 12:
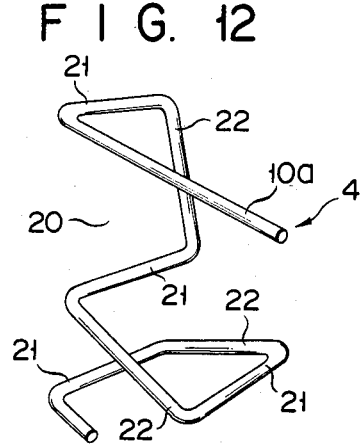
FIG. 12 is a perspective view of the intermediate support spring shown in FIG. 11.

In the above-described embodiment, moreover, each intermediate support spring 4 is provided with a coil spring portion 10. Alternatively, however, the coil spring portion 10 may be replaced with a torsion spring portion 20, as shown in FIGS. 11 and 12. The torsion spring portion 20 is formed of a plurality of torsion rods 21 arranged parallel to one another and a plurality of connecting rods 22, each of which is continuous to the corresponding two adjacent torsion rods 21. A straight rod portion 10a is continuous at both ends to the uppermost torsion rods 21 of the torsion spring portions 20. These torsion spring portions 20 can support the rod portions 8 of the main springs 3 with sufficient elasticity.

Figure 13:
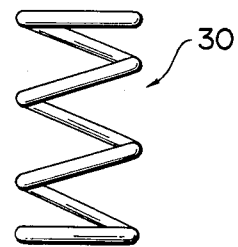
FIG. 13 is a side view of a single coil spring.
Figure 14:
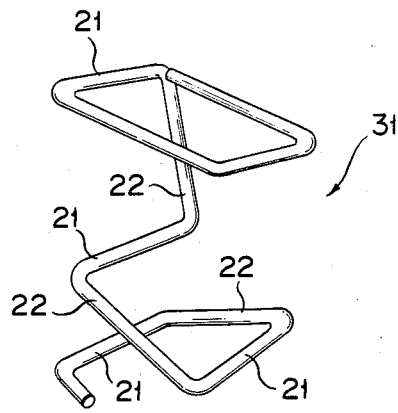
FIG. 14 is a perspective view of a single torsion spring.

Furthermore, each intermediate support spring 4 may be replaced by a single coil spring 30, as shown in FIG. 13, or a single torsion spring 31, as shown in FIG. 14, which is not provided with the rod portion 10A.

What is claimed is:
1. A spring unit, comprising:
a base plate including a first rectangular frame and parallel cross pieces;
a second rectangular frame disposed parallel to said base plate;
a plurality of main springs, each having
a first straight connecting rod portion,
two first coil portions, each first coil portion having a longitudinal axis and two ends, said first coil portions being interconnected at one end by said first straight connecting rod portion; and
a straight segment, extending substantially perpendicular to said first straight connecting rod portion and formed between said first straight connecting rod portion and each first coil portion,
said first straight connecting rod portion, said first coil portions and said straight segments being integrally formed as a single length of wire, and
each first coil portion having sections, along said longitudinal axis thereof, of differing diameters,
wherein each of said main springs has its first coil portions disposed on opposite sides of said first rectangular frame with the first straight connecting rod portions of a first plurality of said main springs arranged at right angles to the first straight connecting rod portions of a second plurality of said main springs to form a lattice;
first fastening means for fastening the end of each first coil portion remote from said first straight connecting rod portion to a corresponding side of said first rectangular frame;
first clip means for tightly fixing said second rectangular frame to the straight segment at said one end of each first coil portion and maintaining said straight segments in tight linear contact with said rectangular frame;

a plurality of intermediate support springs, each having a second straight connecting rod portion, two second coil portions, and second straight segments formed between said second straight connecting rod portion and each second coil portion so that one end of each of said two second coil portions is connected to a corresponding one of two ends of said second straight connecting rod portion with a corresponding second straight segment interposed therebetween, each of said second straight connecting rod portions being shorter than each of said first straight connecting rod portions, and said plurality of intermediate support springs is disposed on said cross pieces of said first rectangular frame so that the two second coil portions of each intermediate support spring are at diagonally opposite corners of intersections of said lattice;

second clip means for tightly fixing the second straight segments at one end of each intermediate support spring to intersecting ones of said first straight connecting rod portions at said intersections of said lattice;

second fastening means for fastening the other end of each intermediate support spring to said cross pieces of said first rectangular frame;

a plurality of corner springs, each corner spring being integrally formed from a single length of wire and being arranged between respective corners of said first and said second rectangular frames, each of said corner springs comprising a third coil portion having two ends, and a third straight connecting rod portion formed integrally with one end of said third coil portion, said third straight connecting rod portion having a free end bent at a given angle relative to the remainder of said third straight connecting rod portion to form a third straight segment extending integrally from said third straight connecting rod portion;

third fastening means for fastening the other end of each of said third coil portions to a corresponding corner of said first rectangular frame;

fourth fastening means for fastening each of said third coil portions to a corresponding corner of said second rectangular frame in the vicinity of said one end of said third coil portions; and third clip means for tightly fixing said third straight segment of each said corner spring to a first straight connecting rod portion of an associated main spring and maintaining the third straight segment in tight linear contact with the first straight connecting rod portion, such that said third straight connecting rod portion extends at a given angle relative to said first straight connecting rod portion to which it is fixed.

2. A spring unit according to claim 1, wherein the second coil portions of each intermediate support spring are coil springs.

3. A spring unit according to claim 1, wherein each first coil portion is shaped like a cone.

4. A spring unit according to claim 1, wherein each first coil portion is shaped like an hourglass.

5. A spring unit according to claim 1, wherein each first coil portion is shaped like a barrel.

* * * * *

UNITED STATES PATENT AND TRADEMARK OFFICE
CERTIFICATE OF CORRECTION

PATENT NO. : 4,664,361

DATED : May 12, 1987

INVENTOR(S) : N. SASAKI

It is certified that error appears in the above-identified patent and that said Letters Patent is hereby corrected as shown below:

Title page, left-hand column, under Foreign Application Priority Data, the Japanese application identified as "58-115286" should be -- 58-115286(U)--.

Signed and Sealed this

Fifth Day of April, 1988

Attest:

DONALD J. QUIGG

*Attesting Officer*　　　*Commissioner of Patents and Trademarks*